United States Patent [19]
Anderson

[11] Patent Number: 6,025,949
[45] Date of Patent: Feb. 15, 2000

[54] LINE MONITORING OF AN OPTICAL TRANSMISSION SYSTEM USING PILOT SIGNALS

[75] Inventor: Cleo Dale Anderson, Colts Neck, N.J.

[73] Assignee: Tyco Submarine Systems Ltd., Morristown, N.J.

[21] Appl. No.: 08/872,470

[22] Filed: Jun. 10, 1997

[51] Int. Cl.[7] .......................... H04B 10/16; H04B 10/00
[52] U.S. Cl. .................. 359/179; 359/160; 359/174; 359/162; 359/110
[58] Field of Search ...................................... 359/110, 173, 359/174, 175, 176, 177, 134, 160, 179, 341, 162, 152; 385/24

[56] References Cited

U.S. PATENT DOCUMENTS

| | | | |
|---|---|---|---|
| 5,083,874 | 1/1992 | Aida et al. | 359/173 |
| 5,436,746 | 7/1995 | Hirst | 359/110 |
| 5,436,750 | 7/1995 | Kawano | 359/177 |
| 5,440,418 | 8/1995 | Ishimura et al. | 359/177 |
| 5,668,658 | 9/1997 | Hamada | 359/179 |
| 5,719,693 | 2/1998 | Tanoue | 359/174 |
| 5,790,294 | 8/1998 | Horiuchi et al. | 359/177 |
| 5,818,629 | 10/1998 | Kinoshita | 359/174 |

*Primary Examiner*—Kinfe-Michael Negash
*Attorney, Agent, or Firm*—Brian K. Dinicola

[57] ABSTRACT

An optical transmission system allows for the remote determination of the total output power of each repeater. The optical transmission system includes two terminals, an optical path that transmits a plurality of optical signals between the two terminals, and a plurality of repeaters spaced along the optical path. In each of the repeaters, pilot signals are inserted by impressing them upon the amplified optical signals output from the repeater. The pilot signals are derived from an oscillator whose frequency is unique to the repeater in which the pilot signals are inserted. The magnitude of each pilot signal is proportional to the output power of its associated repeater. Each terminal provides a measurement of the total power output from each repeater using a receiving device. The receiving device selects the unique oscillator frequency for each of the repeaters desired to be measured, and measures the pilot signals at the selected frequency.

21 Claims, 3 Drawing Sheets

LINE MONITORING OF AN OPTICAL TRANSMISSION SYSTEM USING PILOT SIGNALS

FIELD OF THE INVENTION

The present invention is directed to line monitoring of optical transmission systems. More particularly, the present invention is directed to line monitoring of optical transmission systems using pilot signals to determine the total output power of each repeater in the system.

BACKGROUND OF THE INVENTION

Long distance optical transmission systems generally require a plurality of amplifiers located along the length of the optical fibers to periodically amplify the optical signals. It is essential in these systems to provide the ability to remotely monitor the performance of any amplifier, and to locate the source of system degradation or fault to a particular amplifier or cable section.

Most known methods for remotely monitoring the performance of optical amplifiers in an optical transmission system require an optical loopback path between adjacent amplifiers on the forward and return optical paths, and the generation of a test signal on at least one end of the system. For example, U.S. Pat. No. 5,436,746 discloses an optical transmission system that includes multiple loopbacks. A test signal is generated at the local station, or terminal, and transmitted on a forward path. The test signal is returned to the local station via the optical loopbacks and a return path. Measurement of the test signal provides information that is related to the performance of the amplifiers within the optical transmission system.

The method of using loopback paths to remotely measure the performance of amplifiers has several disadvantages. Specifically, the loopback method requires test signals to be both transmitted and received on associated fiber pairs at a terminal of the transmission system. The test signals must travel over an optical fiber pair (i.e., the forward path and the return path). Therefore, the loop loss information provided by the loopback method is ambiguous because there is no way to tell how the loop losses are distributed between the forward and return path.

Further, the loop loss information provided by the loopback method is redundant because the same information is measured at both terminals of the transmission system. In addition, the optical loopback paths between adjacent amplifiers cause a significant transmission impairment in the form of crosstalk or added noise. Finally, the loopback method, when used to provide information in-service (i.e., while the optical transmission system is transmitting signals) requires a long time (approximately 2–8 hours) to obtain a measurement due to the typical poor signal-to-noise (S/N) ratio of the monitoring signal. Transmission systems that utilize multiple carrier wavelengths, and their corresponding monitoring signal, have lower S/N ratios than single wavelength systems, and therefore obtaining measurements using the loopback method in these systems impose an even greater time delay.

Based on the foregoing, there is a need for a method and apparatus for remotely measuring amplifier performance that does not require a fiber pair to obtain measurements, and provides measurement information quicker and more accurately than known methods, especially when multiple carrier wavelengths are used.

SUMMARY OF THE INVENTION

The above-described needs are met by the present invention which remotely determines the total output power of each repeater in an optical transmission system. In one embodiment, the optical transmission system includes two terminals, an optical path that transmits a plurality of optical signals between the two terminals, and a plurality of repeaters spaced along the optical path.

In each of the repeaters, pilot signals are inserted by impressing them upon the amplified optical signals output from the repeater. The magnitude of each pilot signal is proportional to the output power of its associated repeater. The pilot signals are derived from an oscillator whose frequency is unique to the repeater in which the pilot signals are inserted. Each terminal provides a measurement of the total power output from each repeater using a receiving device. The receiving device selects the unique oscillator frequency for each of the repeaters desired to be measured, and measures the pilot signals at the selected frequency.

DETAILED DESCRIPTION

Figure 1:
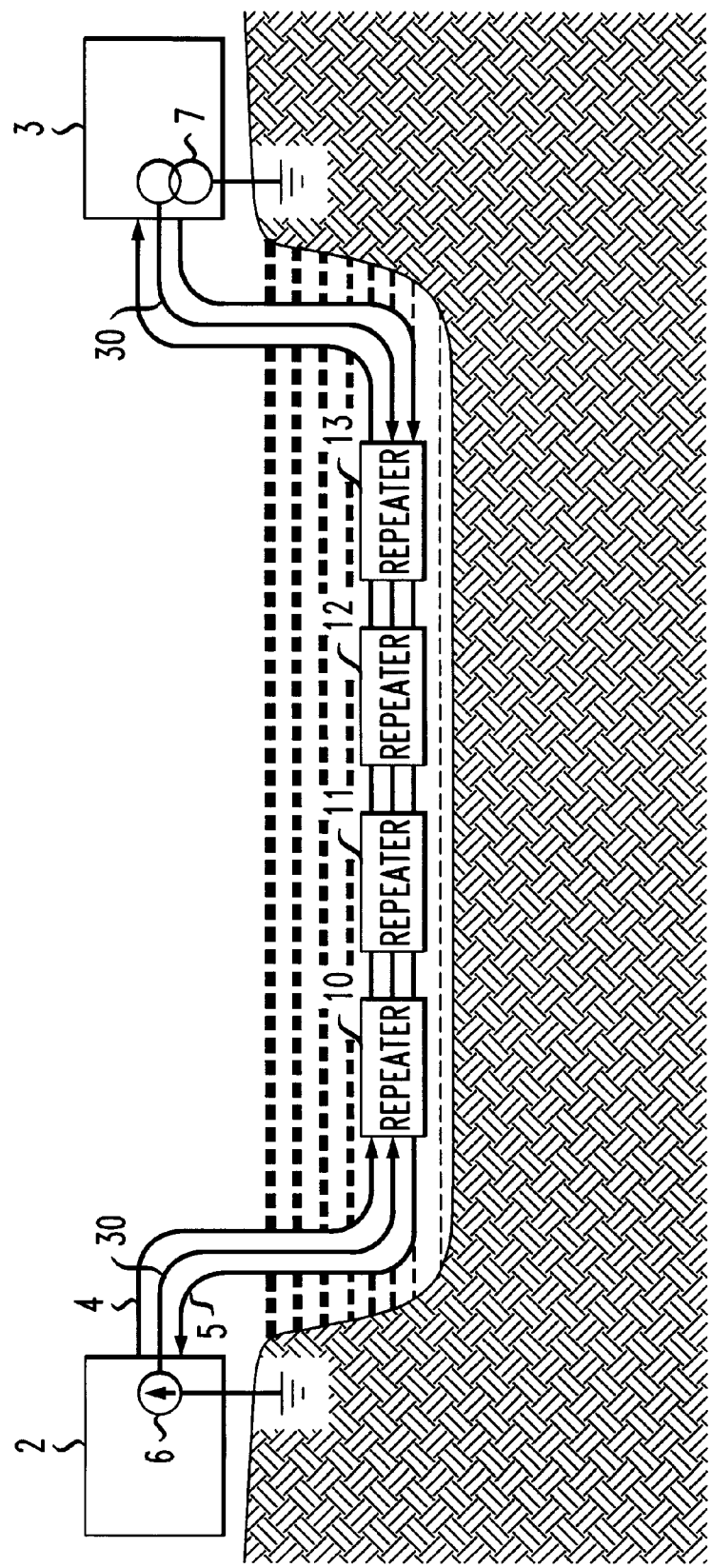
FIG. 1 illustrates an optical transmission system in accordance with one embodiment of the present invention.

The present invention provides a measurement of the output power of each repeater in an optical transmission system. FIG. 1 illustrates an optical transmission system in accordance with one embodiment of the present invention. The transmission system of FIG. 1 is a long distance underwater system that transmits optical communication signals between a terminal 2 and a terminal 3. The communication signals are sent from terminal 2 to terminal 3 via optical path 4 and are sent from terminal 3 to terminal 2 via optical path 5. Each optical path 4, 5 includes up to four optical fibers.

A plurality of repeaters 10–13 are located in a series of predetermined intervals along optical paths 4 and 5. Repeaters 10–13 include an amplifier for each optical fiber passing through them. The amplifiers amplify the optical signals as they travel between terminals 2 and 3.

Terminal 2 includes a constant DC current source 6 which produces a constant electrical current of predetermined magnitude. The current provides power to repeaters 10–13 via center conductor 30. Center conductor 30 is connected to voltage source 7 in terminal 3. Both current source 6 and voltage source 7 are connected to ground.

Figure 2:
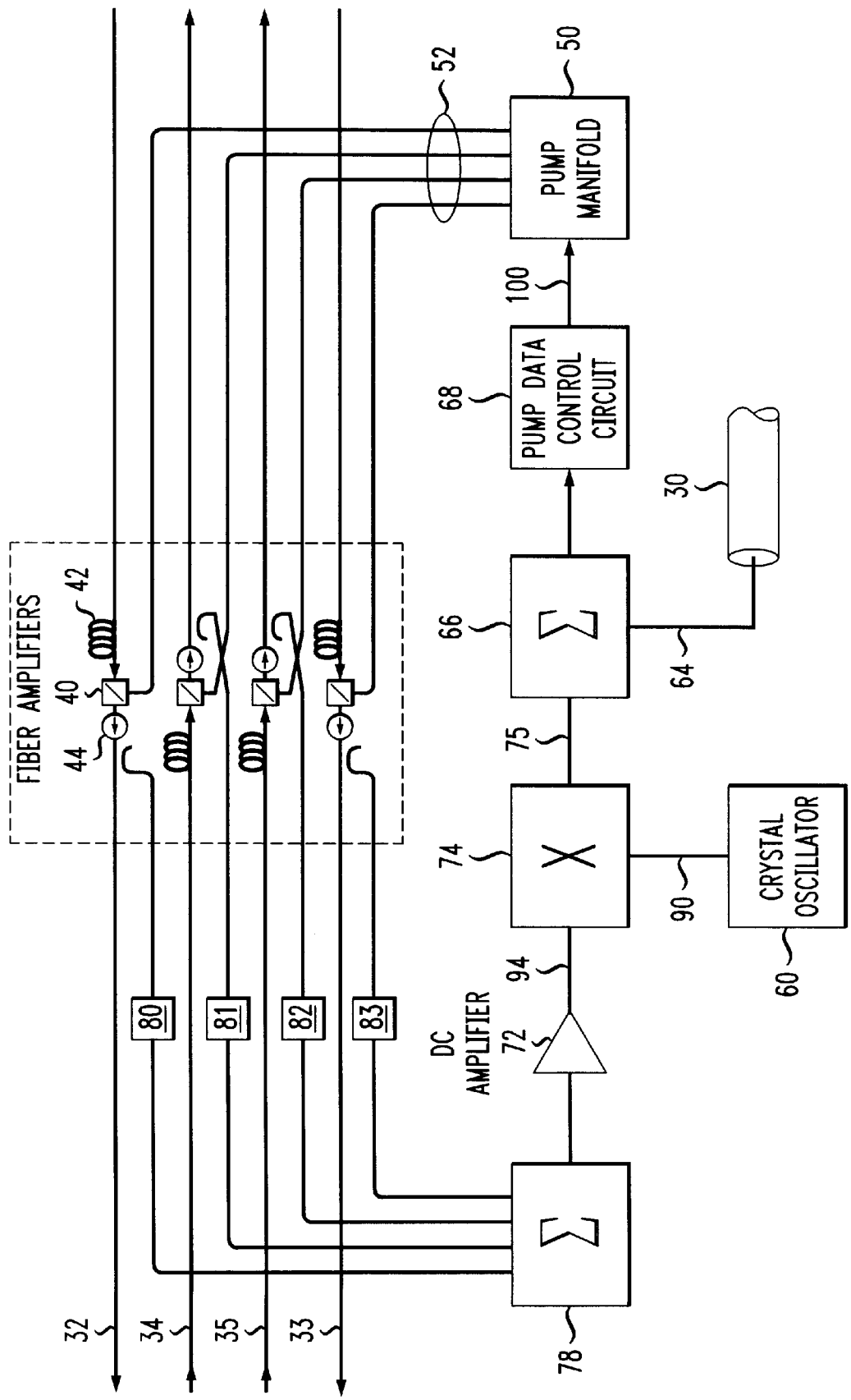
FIG. 2 is a detailed illustration of a repeater in accordance with one embodiment of the present invention.

FIG. 2 is a detailed illustration of repeater 10 in accordance with one embodiment of the present invention. Optical fibers 32 and 33, which form optical path 5 shown in FIG. 1, transmit optical signals from right to left in FIG. 2. Optical fibers 34 and 35, which form optical path 4, transmit optical signals in a direction opposite to that of optical fibers 32 and 33.

A pump manifold 50 includes a plurality of pump lasers. The pump lasers are powered by current received from a pump bias control circuit 68 on path 100. The pump lasers produce pumping power proportional to the input current in a known manner. The pumping power is output from pump manifold 50 on paths 52.

Optical fibers 32–35 each include identical amplifier components. Referring to optical fiber 32, path 52 is coupled to a directional wavelength selective coupler 40. Coupler 40 causes the optical energy output by pump manifold 50 on path 52 to be directed into an erbium doped fiber 42 which amplifies optical signals on optical fiber 32. Optical fiber 32 also includes an optical isolator 44 which prevents power from flowing backwards.

Repeater 10 further includes an oscillator circuit that inserts pilot signals by impressing the pilot signals onto the amplified optical signals output from repeater 10. The oscillator circuit includes a crystal oscillator 60 that generates a signal at a frequency unique to repeater 10. Each repeater 10–13 in the optical transmission system is identical except that its corresponding oscillator generates a signal at a different frequency. In one embodiment, the frequency separation between repeaters 10–13 is approximately 200–400 Hz, and all of the oscillator frequencies in the optical transmission system is within a band of approximately 0.5–0.6 MHz.

The AC current signal from crystal oscillator 60 is input to a multiplier 74 via path 90. Also input to multiplier 74 is a DC current signal via path 94 that is proportional to the total output power of the amplifiers in repeater 10. The DC current signal is generated by photo detectors 80–83 which are coupled to optical fibers 32, 34, 35 and 33, respectively via couplers, and measure the power of the amplified optical signals. Approximately ten percent of the amplified power on fibers 32–35 is directed to photo detectors 80–83 by the couplers. Photo detectors 80–83 output a current that is proportional to their input optical power.

The outputs of photo detectors 80–83 are input to a summation device 78. The output of summation device 78 is input to a DC amplifier 72 which outputs an amplified DC signal component. The output of amplifier 72 is input to multiplier 74 as the total power signal via path 94. The output of multiplier 74 is an AC current with a frequency equal to the frequency of crystal oscillator 60 and with a magnitude proportional to the total output power of repeater 10.

The AC current output from multiplier 74 is input to summing device 66 via path 75. Also input to summing device 66 via path 64 is the DC current from center conductor 30. The level of the AC current is very small in comparison to the level of the DC current. In one embodiment, the level of the AC current is one percent of the level of the DC current.

The output of summing device 66 is input to pump bias control circuit 68. Pump bias control circuit 68 outputs a DC bias current and the AC current. The output from pump bias control circuit 68 is coupled to the pump lasers in pump manifold 50 via path 100. Because amplifier output power is proportional to pump current, the AC current that is coupled to the pump lasers via path 100 causes the amplifier output power on optical fibers 32–35 to change very slightly at the rate of oscillator 60. This causes amplitude modulated sidebands, referred to as pilot signals, to be impressed on all amplified optical signals output from repeater 10. The magnitude of the pilot signals corresponds to the total power output of repeater 10.

Figure 3:
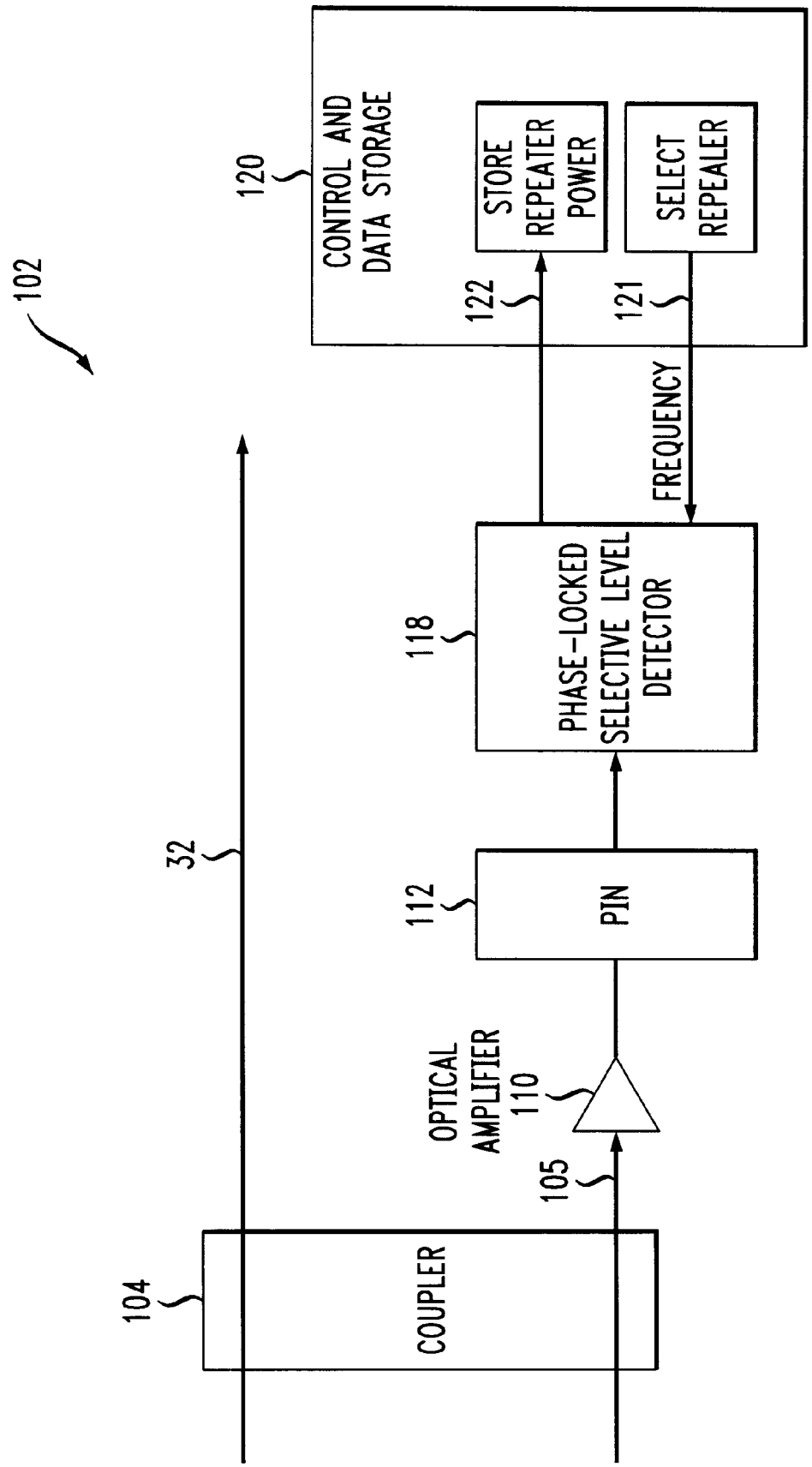
FIG. 3 is a detailed illustration of a receiving device within a terminal in accordance with one embodiment of the present invention.

FIG. 3 is a detailed illustration of a receiving device 102 within terminal 2. Terminal 3 also includes a similar receiving device. The receiving device 102 shown in FIG. 3 is used to recover and measure the line monitoring pilot signals that are inserted in each repeater 10–13.

As shown in FIG. 3, receiving device 102 is coupled to optical fiber 32 through an optical coupler 104. However, receiving device 102 can be coupled to any fiber transmitting incoming optical signals to terminal 2 (i.e., fibers 32 or 33).

A portion of the optical signals transmitted on optical fiber 32 is coupled to fiber 105 by an optical coupler 104. The optical signals are then amplified by an optical amplifier 110 and converted to electrical signals by a photo detector 112.

A control & data storage unit 120 selects a repeater for measuring the total output power. A repeater is selected by specifying a frequency that coincides with the frequency of an oscillator included in a repeater 10–13. The frequency is input to a phase-locked homodyne or heterodyne selective level detector 118 via path 121. The signal output from photo detector 112 is also input to selective level detector 118. Selective level detector 118 locks on to the portion of the input signal that coincides with the input frequency. Therefore, selective level detector 118 isolates and selects the pilot signal inserted by the repeater that includes the oscillator of the selected frequency.

Selective level detector 118 includes a selective level measuring set that measures the selected pilot signal power. This power is proportional to the total power output of the repeater that inserted the selected pilot signals. The power level is stored in control and data storage device 120 via path 122 for later reference.

The selection process by level detector 118 and control and data storage device 120 is repeated until the total output power level is measured for each repeater 10–13. Therefore, the combination of the repeaters and the receiving device in accordance with the present invention provides a measurement of total output power of each of the repeaters in the optical transmission system.

The present invention provides many advantages over the prior art loopback method. Measurements of total power output of each repeater using the present invention can be performed in approximately one second. Further, the present invention requires only receiving equipment at the terminal. In addition, the present invention does not provide ambiguous information because each terminal only provides measurements for the received signals.

One embodiment of the present invention is specifically illustrated and/or described herein. However, it will be appreciated that modifications and variations of the present invention are covered by the above teachings and within the purview of the appended claims without departing from the spirit and intended scope of the invention.

For example, although an underwater long distance optical transmission system is described, the present invention can be implemented on any optical transmission system that includes repeaters. Further, other alternative methods of impressing amplitude modulation on the amplified signals other than the method of pump current modulation that is used in the described embodiment can also be implemented.

What is claimed is:

1. An optical transmission system for transmitting optical signals, said system comprising:
   a first terminal and a second terminal;
   a first optical path to transmit a first plurality of optical signals from said first terminal to said second terminal;
   a second optical path to transmit a second plurality of optical signals from said second terminal to said first terminal; and
   a plurality of repeaters spaced along said first and second paths;
   wherein each of said repeaters comprise:
   a plurality of fiber amplifiers;
   a pumping power source coupled to said plurality of fiber amplifiers; and an oscillator circuit coupled to said pumping power source that impresses a pilot signal of a fixed frequency onto each of said first plurality of optical signals and said second plurality of optical signals transmitted on said first and second optical paths, wherein said fixed frequency is unique in each of said repeaters; and wherein said first terminal comprises:

a receiving device coupled to said second optical path, wherein said receiving device receives one of said second plurality of optical signals and determines, based on a first plurality of pilot signals impressed on said one of said second plurality of optical signals, the total output power of each of said plurality of repeaters.

2. The optical transmission system of claim 1, wherein said oscillator circuit comprises:

an oscillator that generates a first alternating current (AC) at said fixed frequency; and a pump bias control circuit coupled to said oscillator.

3. The optical transmission system of claim 2, wherein said oscillator circuit further comprises:

a plurality of photo detectors that measure a power of said first plurality of optical signals and said second plurality of optical signals; and a multiplier coupled to said photo detectors and said oscillator that generates a second AC, wherein the second AC has a frequency equal to said fixed frequency and a magnitude proportional to said measured power of said first plurality of optical signals and said second plurality of optical signals.

4. The optical transmission system of claim 3, wherein said multiplier is further coupled to a direct current (DC), and the level of the first AC is approximately one percent of the level of the DC.

5. The optical transmission system of claim 1, wherein said receiving device comprises:

a photo detector coupled to said one of said second plurality of optical signals;

a phase-locked selective level detector coupled to said photo detector, said level detector selects and measures the power level of one of said first plurality of pilot signals; and a storage device coupled to said level detector that stores the output of said level detector.

6. The optical transmission system of claim 1, wherein said pilot signal is formed by amplitude modulating at least one of said first plurality of optical signals and said second plurality of optical signals.

7. The optical transmission system of claim 1, wherein the fixed frequencies of the pilot signals impressed by said plurality of repeaters are separated by approximately 200–400 Hertz.

8. A method for remotely determining the total power output of a plurality of repeaters in an optical transmission system that comprises a first terminal and a second terminal, an optical path that transmits a plurality of optical signals between the first and second terminals, wherein the plurality of repeaters are spaced along the optical path, said method comprising the steps of:

(a) at each of the repeaters, impressing a plurality of pilot signals onto a plurality of amplified optical signals output from the repeater, wherein said plurality of pilot signals have a fixed frequency unique to the repeater; and (b) at each of the first and second terminals, selecting the fixed frequency for each of the repeaters and measuring a power level of one of the plurality of pilot signals impressed by said repeater at the selected fixed frequency.

9. The method of claim 8, wherein step (a) comprises the steps of:

(a-1) generating an AC current at the fixed frequency;

(a-2) impressing the AC current onto a DC current to generate a resultant current; and (a-3) powering at least one pumping laser using the resultant current.

10. The method of claim 9, wherein step (a) further comprises the step of maintaining a power level of the plurality of impressed pilot signals at a level proportional to the total output power of the repeater.

11. The method of claim 8, wherein step (b) comprises the steps of:

(b-1) detecting one of the plurality of optical signals; and (b-2) selecting at least one pilot signal on the detected optical signal.

12. The method of claim 8, wherein the fixed frequencies of the plurality of pilot signals impressed by each of said repeaters is separated by approximately 200–400 Hertz.

13. A repeater in an optical transmission system that transmits a plurality of optical signals, said repeater comprising:

a fiber amplifier to amplify said plurality of optical signals;

a pumping power source coupled to said fiber amplifier; and an oscillator circuit coupled to said pumping power source that impresses a pilot signal of a unique frequency and a magnitude proportional to a measured power of said plurality of optical signals amplified by said fiber amplifier onto each of said plurality of optical signals.

14. The repeater of claim 13, wherein said oscillator circuit comprises:

an oscillator that generates a first alternating current (AC) at said fixed frequency; and a pump bias control circuit coupled to said oscillator.

15. The repeater of claim 14, wherein said oscillator circuit further comprises:

a plurality of photo detectors that measure a power of said plurality of optical signals amplified by said fiber amplifier; and a multiplier coupled to said photo detectors and said oscillator that generates a second AC, wherein the second AC has a frequency equal to said fixed frequency and a magnitude proportional to said measured power of said plurality of optical signals amplified by said fiber amplifier.

16. The repeater of claim 13, wherein said pilot signal is formed by amplitude modulating at least one of said plurality of optical signals amplified by said fiber amplifier.

17. A repeater to transmit an optical signal, comprising:

a fiber amplifier to output the optical signal at an amplified power;

an oscillator circuit, coupled to said fiber amplifier, to impress a pilot signal onto the optical signal;

wherein the pilot signal has a frequency unique to the repeater and a magnitude proportional to the amplified power of the optical signal.

18. The repeater of claim 17, wherein the oscillator circuit comprises:
   an oscillator to generate a first alternating current (AC) at said frequency unique to the repeater; and
   a pump bias control circuit coupled to said oscillator.

19. The repeater of claim 18, further comprising
   a photo detector, coupled to said fiber amplifier, that measures the amplified power of the optical signal; and
   wherein said oscillator circuit further comprises:
      a multiplier, coupled to said photo detector and said oscillator, to generate a second AC, wherein the second AC has a frequency equal to said frequency unique to the repeater and a magnitude proportional to the amplified power of the optical signal.

20. The repeater of claim 18, further comprising:
   a terminal, including:
      a terminal photo detector to receive at least a portion of the optical signal;
      a selective level detector coupled to said terminal photo detector, said selective level detector to measure the power level of the pilot signal impressed on the optical signal; and
      a storage device coupled to said selective level detector to store the output of said selective level detector.

21. The repeater of claim 17, wherein said pilot signal is formed by amplitude modulating.

* * * * *